(12) United States Patent
Mun et al.

(10) Patent No.: US 11,996,244 B2
(45) Date of Patent: May 28, 2024

(54) MULTILAYER ELECTRONIC COMPONENT AND METHOD OF MANUFACTURING THE SAME

(71) Applicant: SAMSUNG ELECTRO-MECHANICS CO., LTD., Suwon-si (KR)

(72) Inventors: Seon Jae Mun, Suwon-si (KR); Gi Long Kim, Suwon-si (KR); Kyoung Jin Cha, Suwon-si (KR); Tae Gyeom Lee, Suwon-si (KR); Byung Rok Ahn, Suwon-si (KR); Jong Ho Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 45 days.

(21) Appl. No.: 17/723,919

(22) Filed: Apr. 19, 2022

(65) Prior Publication Data
US 2022/0384114 A1    Dec. 1, 2022

(30) Foreign Application Priority Data

May 25, 2021  (KR) .................. 10-2021-0066992
Dec. 29, 2021  (KR) .................. 10-2021-0190587

(51) Int. Cl.
*H01G 4/30*     (2006.01)
*H01G 4/012*    (2006.01)
(Continued)

(52) U.S. Cl.
CPC .............. *H01G 4/30* (2013.01); *H01G 4/012* (2013.01); *H01G 4/1227* (2013.01); *H01G 13/06* (2013.01)

(58) Field of Classification Search
CPC .......... H01G 4/30; H01G 4/248; H01G 4/005; H01G 4/2325; H01G 4/008; H01G 4/0085;
(Continued)

(56) References Cited

U.S. PATENT DOCUMENTS

2012/0306325 A1   12/2012   Kim
2012/0327555 A1*  12/2012   Ahn ..................... H01G 4/232
                                                    361/321.1
(Continued)

FOREIGN PATENT DOCUMENTS

JP   2018-103509 A    7/2018
KR   10-2012-0133697 A   12/2012

*Primary Examiner* — Michael P McFadden
(74) *Attorney, Agent, or Firm* — Morgan, Lewis & Bockius LLP

(57) ABSTRACT

A multilayer electronic component includes: a body including internal electrodes alternately disposed with dielectric layers in a first direction, wherein when a region in which the internal electrodes overlap each other in the first direction is a capacitance forming portion, the internal electrodes include internal electrodes that are curved at end portions thereof in the capacitance forming portion and internal electrodes that are flat in the capacitance forming portion, and in a cross-section of the body in the first and second directions, $(F1+F2)/D1\times100$ is 35 or less, where F1 is a maximum distance from an uppermost internal electrode to an uppermost flat internal electrode in the first direction, F2 is a maximum distance from a lowermost internal electrode to a lowermost flat internal electrode in the first direction, and D1 is a size of the capacitance forming portion in the first direction at the center thereof in the second direction.

23 Claims, 11 Drawing Sheets

(51) Int. Cl.
*H01G 4/12* (2006.01)
*H01G 13/06* (2006.01)

(58) Field of Classification Search
CPC .......... H01G 4/12; H01G 4/224; H01G 4/228; H01G 4/1218
See application file for complete search history.

(56) References Cited

U.S. PATENT DOCUMENTS

| | | | |
|---|---|---|---|
| 2016/0247632 A1* | 8/2016 | Tsukida | H01G 4/0085 |
| 2017/0162330 A1* | 6/2017 | Kan | H01G 4/012 |
| 2017/0250026 A1* | 8/2017 | Mizuno | H01G 4/30 |
| 2019/0221368 A1* | 7/2019 | Ono | H01G 4/30 |
| 2020/0066453 A1* | 2/2020 | Jeong | H01G 4/248 |
| 2021/0020378 A1* | 1/2021 | Fukuma | H01G 4/224 |

* cited by examiner

MULTILAYER ELECTRONIC COMPONENT AND METHOD OF MANUFACTURING THE SAME

CROSS-REFERENCE TO RELATED APPLICATION(S)

This application claims benefit of priorities to Korean Patent Application Nos. 10-2021-0066992 filed on May 25, 2021 and 10-2021-0190587 filed on Dec. 29, 2021 in the Korean Intellectual Property Office, the disclosures of which are incorporated herein by reference in its entirety.

TECHNICAL FIELD

The present disclosure relates to a multilayer electronic component and a method of manufacturing the same.

BACKGROUND

A multilayer ceramic capacitor (MLCC), a multilayer electronic component, is a chip-type condenser mounted on a printed circuit board for use in various electronic products, such as image devices, e.g. a liquid crystal display (LCD) and a plasma display panel (PDP), computers, smartphones, and mobile phones, serving to charge or discharge electricity therein or therefrom.

The multilayer ceramic capacitor may be used as a component for various electronic apparatuses because it has a small size, secures high capacitance, and is easy to mount. In accordance with decreases in size and increases in output of various electronic apparatuses such as computers and mobile devices, there has been an increasing demand for a decrease in size and an increase in capacitance of the multilayer ceramic capacitor.

In order to decrease a size of the multilayer ceramic capacitor and increase a capacitance of the multilayer ceramic capacitor, technology for forming internal electrodes and dielectric layers to be thin is required.

However, the decrease in thickness of the internal electrodes may cause problems such as a short circuit between the internal electrodes, a decrease in capacitance, and a decrease in breakdown voltage of the multilayer ceramic capacitor.

SUMMARY

An aspect of the present disclosure may provide a multilayer electronic component having high reliability.

Another aspect of the present disclosure may suppress unevenness of a thickness of a capacitance forming portion.

Another aspect of the present disclosure may provide a multilayer electronic component including internal electrodes having excellent smoothness.

Another aspect of the present disclosure may provide a highly reliable multilayer electronic component having a small size and a high capacitance.

The aspects of the present disclosure are not limited to those described above, and may be more easily understood in a process of describing exemplary embodiments in the present disclosure.

According to an aspect of the present disclosure, a multilayer electronic component includes: a body including a plurality of dielectric layers and a plurality of internal electrodes alternately disposed with the dielectric layers in a first direction, and having first and second surfaces opposing each other in the first direction, third and fourth surfaces connected to the first and second surfaces and opposing each other in a second direction, and fifth and sixth surfaces connected to the first to fourth surfaces and opposing each other in a third direction; and external electrodes disposed on the body, wherein when a region in which the plurality of internal electrodes overlap each other in the first direction is defined as a capacitance forming portion, the plurality of internal electrodes include internal electrodes that are curved at end portions thereof in the capacitance forming portion and internal electrodes that are flat in the capacitance forming portion, and in a cross-section of the body in the first and second directions, $(F1+F2)/D1\times 100$ is 35 or less, where F1 is a maximum distance from an uppermost internal electrode to an uppermost flat internal electrode in the first direction, F2 is a maximum distance from a lowermost internal electrode to a lowermost flat internal electrode in the first direction, and D1 is a size of the capacitance forming portion in the first direction at the center thereof in the second direction.

According to an aspect of the present disclosure, a multilayer electronic component includes: a body including a capacitance forming portion including a plurality of internal electrodes overlapping each other in a first direction, the plurality of internal electrodes being alternately disposed with dielectric layers in a first direction, wherein $[(G1+G2)/D1]\times 100$ is 2.4 or less, where G1 is a distance from an extension line of an uppermost internal electrode to an end of an internal electrode closest to the uppermost internal electrode in the first direction, G2 is a distance from an extension line of a lowermost internal electrode to an end of an internal electrode closest to the lowermost internal electrode in the first direction, and D1 is a size of the capacitance forming portion in the first direction at the center thereof in a second direction orthogonal to the first direction.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
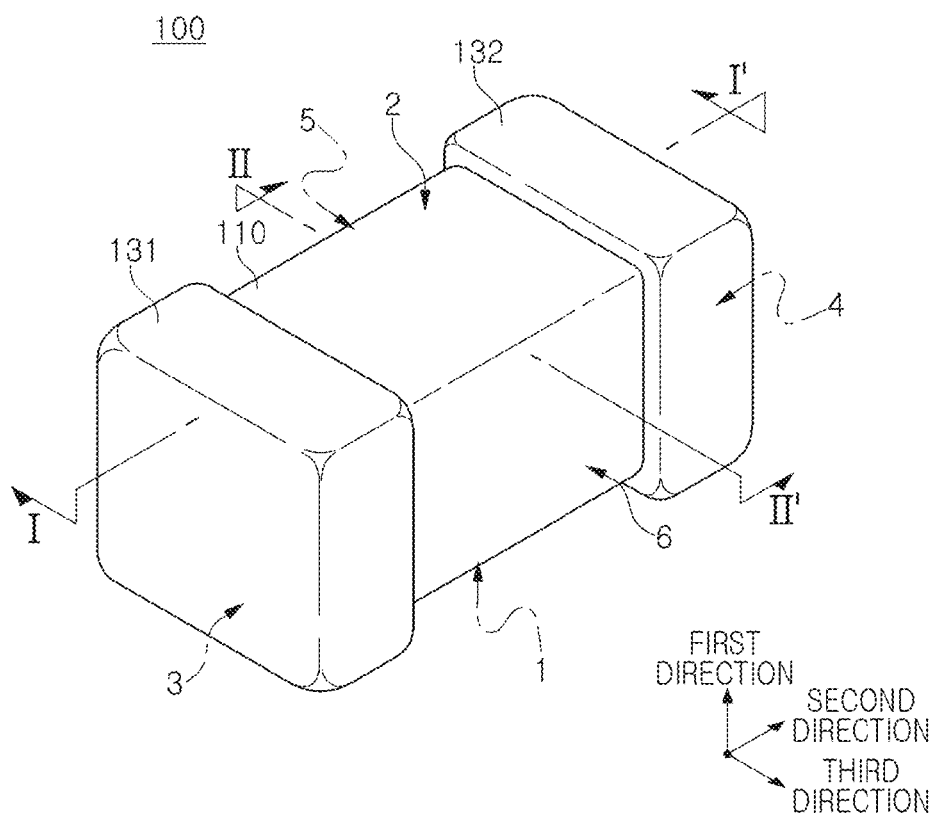
FIG. 1 is a schematic perspective view illustrating a multilayer electronic component according to an exemplary embodiment in the present disclosure.

Hereinafter, exemplary embodiments of the present disclosure will now be described in detail with reference to the accompanying drawings.

In the drawings, a first direction may be defined as a thickness T direction, a second direction may be defined as a length L direction, and a third direction may be defined as a width W direction.

Multilayer Electronic Component

FIG. 1 is a schematic perspective view illustrating a multilayer electronic component according to an exemplary embodiment in the present disclosure.

Figure 2:
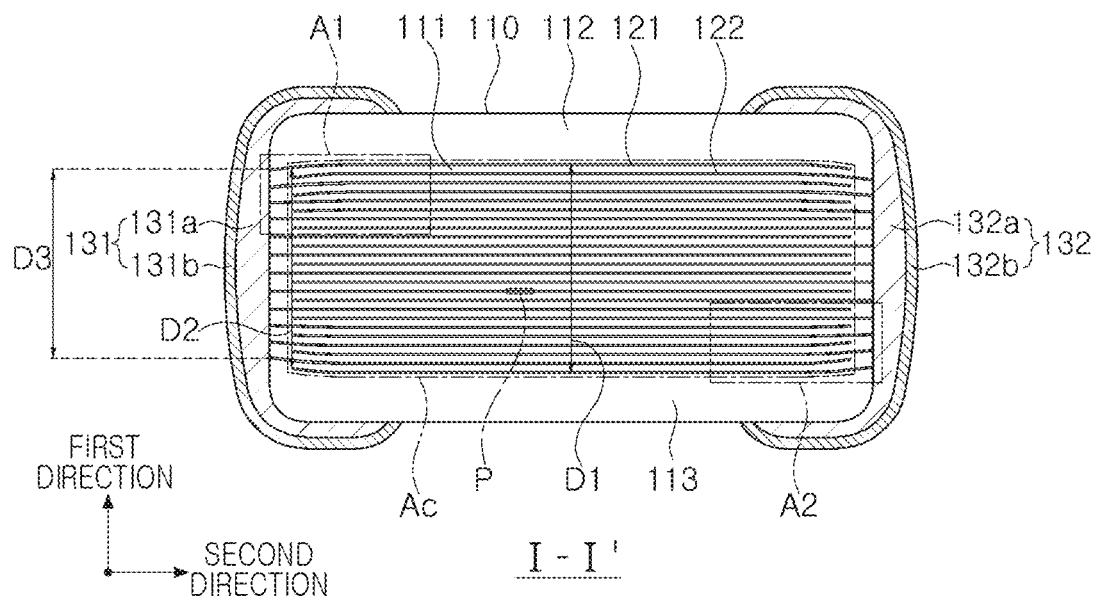
FIG. 2 is a cross-sectional view taken along line I-I' of FIG. 1.

FIG. 2 is a cross-sectional view taken along line I-I' of FIG. 1.

Figure 3:
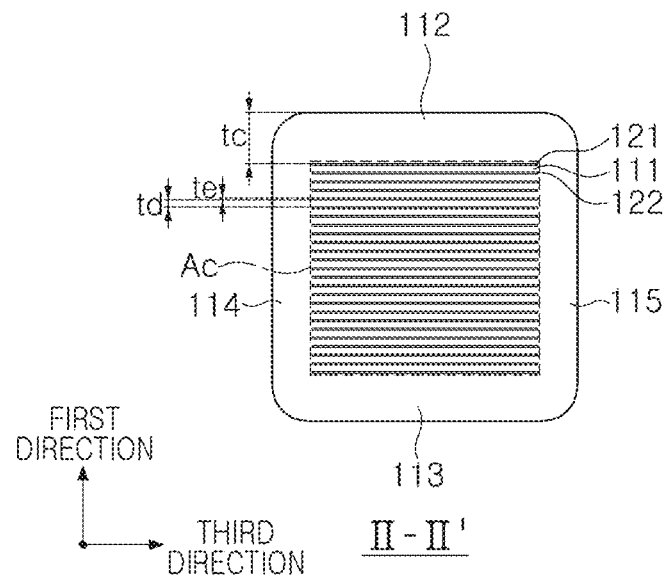
FIG. 3 is a cross-sectional view taken along line II-II' of FIG. 1.

FIG. 3 is a cross-sectional view taken along line II-II' of FIG. 1.

Figure 4:
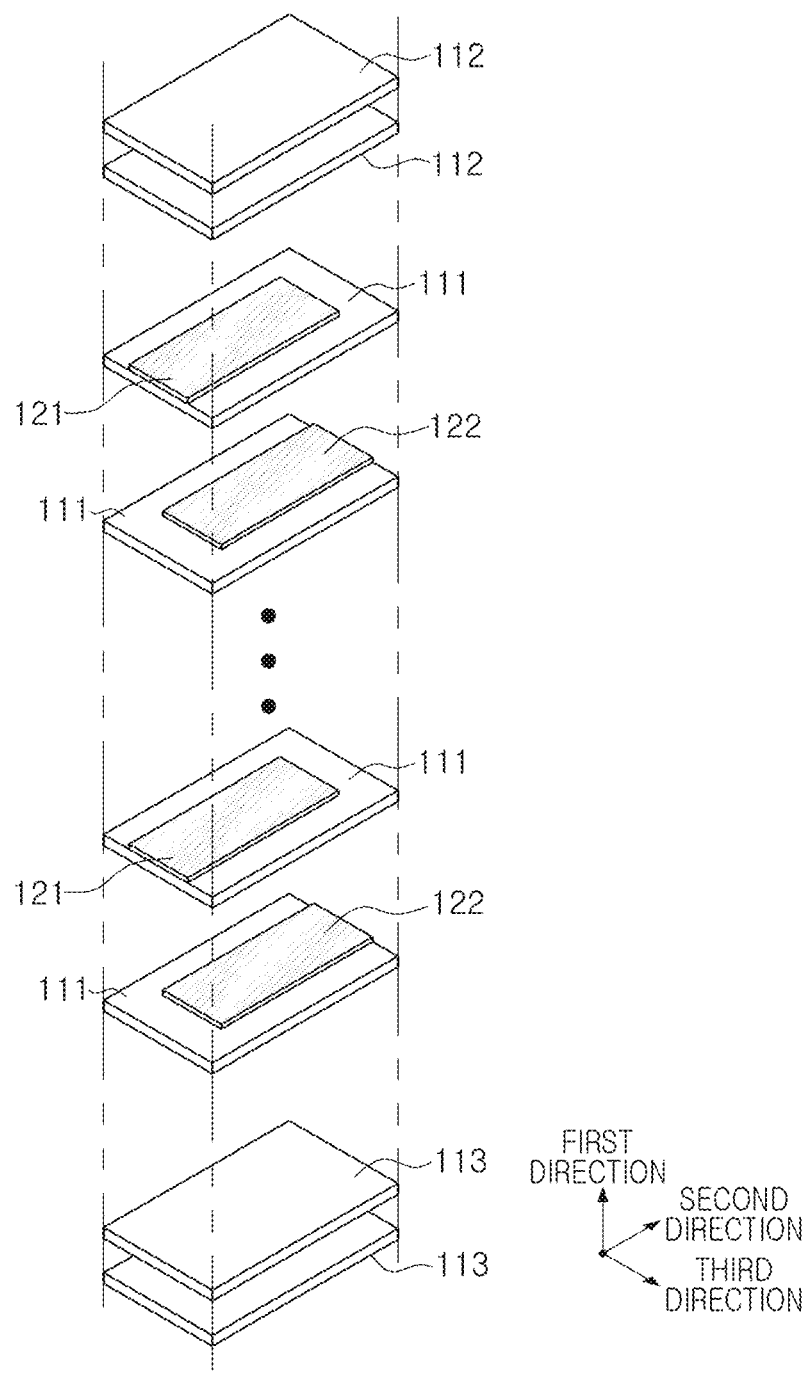
FIG. 4 is a schematic exploded perspective view illustrating a body in which dielectric layers and internal electrodes are stacked of FIG. 1.

FIG. 4 is a schematic exploded perspective view illustrating a body in which dielectric layers and internal electrodes are stacked of FIG. 1.

Figure 5:
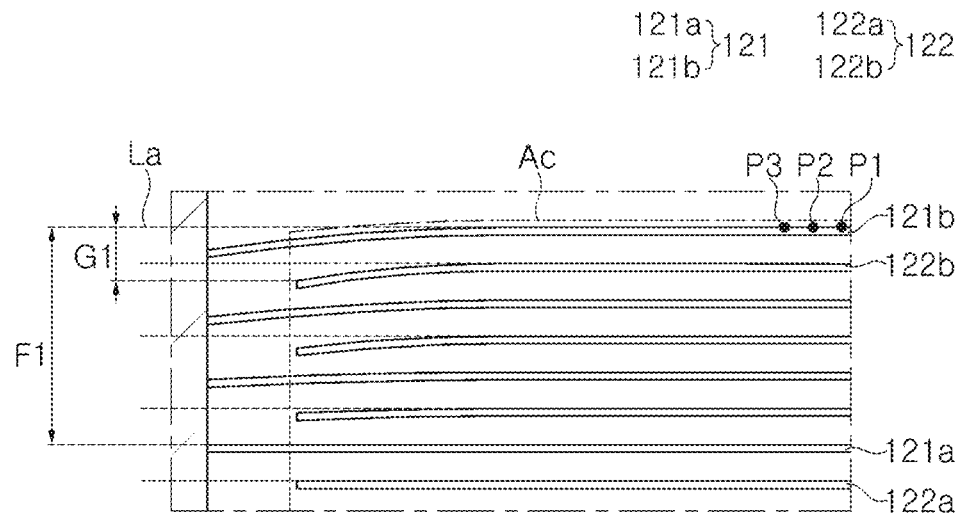
FIG. 5 is an enlarged view of region A1 of FIG. 2.

FIG. 5 is an enlarged view of region A1 of FIG. 2.

Figure 6:
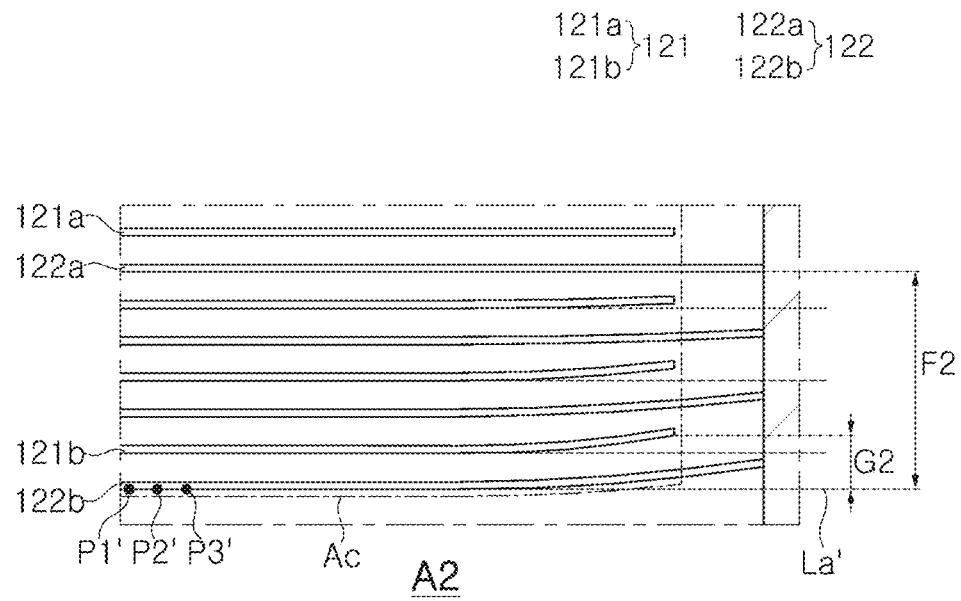
FIG. 6 is an enlarged view of region A2 of FIG. 2.

FIG. 6 is an enlarged view of region A2 of FIG. 2.

Hereinafter, a multilayer electronic component 100 according to an exemplary embodiment in the present disclosure will be described with reference to FIGS. 1 through 6.

The multilayer electronic component according to an exemplary embodiment in the present disclosure may include: a body 110 including a plurality of dielectric layers 111 and a plurality of internal electrodes 121 and 122 alternately disposed with the dielectric layers in the first direction, and having first and second surfaces 1 and 2 opposing each other in the first direction, third and fourth surfaces 3 and 4 connected to the first and second surfaces and opposing each other in the second direction, and fifth and sixth surfaces 5 and 6 connected to the first to fourth surfaces and opposing each other in the third direction; and external electrodes 131 and 132 disposed on the body. When a region in which the plurality of internal electrodes overlap each other is defined as a capacitance forming portion Ac, the plurality of internal electrodes 121 and 122 may include internal electrodes 121b and 122b that are curved at end portions thereof in the capacitance forming portion and internal electrodes 121a and 122a that are flat in the capacitance forming portion. In a cross-section of the body in the first and second directions, when F1 denotes a maximum distance from an uppermost internal electrode to an uppermost flat internal electrode in the first direction, F2 denotes a maximum distance from a lowermost internal electrode to a lowermost flat internal electrode in the first direction, and D1 denotes a size of the capacitance forming portion in the first direction at the center thereof in the second direction, (F1+F2)/D1×100 may be 35 or less.

In order to decrease a size of the multilayer electronic component and increase a capacitance of the multilayer electronic component, technology for forming the internal electrodes and the dielectric layers to be thin is required. However, the decrease in thickness of the internal electrodes may cause problems such as a short circuit between the internal electrodes, a decrease in capacitance, and a decrease in breakdown voltage of the multilayer electronic component.

In particular, the decrease in thickness of the internal electrodes may cause a decrease in smoothness of the internal electrodes, and the internal electrodes 121b and 122b having curved end portions may be included in the capacitance forming portion where the internal electrodes 121 and 122 overlap each other, resulting in unevenness in thickness of the capacitance forming portion Ac. Here, the unevenness in thickness of the capacitance forming portion Ac may mean that, in the cross-section of the multilayer electronic component in the first and second directions, a thickness D2 of the capacitance forming portion Ac at an end thereof in the second direction is smaller than the thickness D1 of the capacitance forming portion Ac at the center thereof in the second direction. Also, the smoothness of the internal electrode may refer to how flat a surface of the internal electrode is, and it may be determined that the more uniform the thickness of the internal electrode is, the higher the smoothness of the internal electrode is.

According to the present disclosure, by controlling the distances F1 and F2 from the outermost internal electrodes to the flat internal electrodes 121a and 122a, the unevenness in thickness of the capacitance forming portion Ac can be suppressed, and the short circuit between the internal electrodes, the decrease in capacitance, the decrease in breakdown voltage, and the like of the multilayer electronic component can be suppressed.

Hereinafter, each of the components of the multilayer electronic component 100 will be described in detail.

In the body 110, the dielectric layers 111 and the internal electrodes 121 and 122 may be alternately stacked.

A specific shape of the body 110 is not particularly limited, and the body 110 may have a hexahedral shape or the like as illustrated. Although the body 110 does not have a hexahedral shape having perfectly straight lines because ceramic powders included in the body 110 shrink in a sintering process, the body 110 may have a substantially hexahedral shape.

The body 110 may have first and second surfaces 1 and 2 opposing each other in the first direction, third and fourth surfaces 3 and 4 connected to the first and second surfaces and opposing each other in the second direction, and fifth and sixth surfaces 5 and 6 connected to the first and second surfaces, connected to the third and fourth surfaces, and opposing each other in the third direction.

The plurality of dielectric layers 111 forming the body 110 may be integrated to such an extent as to be difficult to see a boundary between adjacent dielectric layers 111 in a sintered state without using a scanning electron microscope (SEM).

According to an exemplary embodiment in the present disclosure, a raw material for forming the dielectric layers 111 is not particularly limited as long as sufficient capacitance can be obtained. For example, a barium titanate-based material, a lead composite perovskite-based material, a strontium titanate-based material, or the like may be used as the raw material for forming the dielectric layers 111. The barium titanate-based material may include $BaTiO_3$-based ceramic powders. Examples of the $BaTiO_3$-based ceramic powders may include $BaTiO_3$, and $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1 and 0<y<1), $Ba(Ti_{1-y}Zr_y)O_3$ (0<y<1), or the like, in which calcium (Ca), zirconium (Zr), or the like is partially solid-dissolved in $BaTiO_3$.

In addition, the raw material for forming the dielectric layers 111 may include various ceramic additives, organic solvents, binders, dispersants, and the like, in addition to the barium titanate ($BaTiO_3$)-based powders or the like, according to an object of the present disclosure.

Meanwhile, it is not necessary to particularly limit an average thickness td of the dielectric layer 111. For example, the average thickness td of the dielectric layer 111 may be 0.2 μm or more and 2 μm or less.

However, in general, when the dielectric layers are formed to have a small thickness of less than 0.6 μm, in particular 0.45 μm or less, there is concern that reliability may decrease.

According to an exemplary embodiment in the present disclosure, since the unevenness in thickness of the capacitance forming portion can be suppressed, it is possible to secure excellent reliability even when the average thickness of the dielectric layer 111 is 0.45 μm or less. Therefore, when the average thickness td of the dielectric layer 111 is 0.45 μm or less, the reliability improving effect according to the present disclosure can be more remarkable.

The average thickness td of the dielectric layer 111 may refer to an average thickness of the dielectric layer 111 disposed between the first and second internal electrodes 121 and 122.

The average thickness of the dielectric layer 111 may be measured from an image obtained by scanning a cross-section of the body 110 in the length and thickness (L-T) directions with a scanning electron microscope (SEM) having a magnification of 10,000. More specifically, thicknesses of one dielectric layer at 30 points equally spaced in the length direction may be measured from the scanned image to obtain an average value. The equally-spaced 30 points may be chosen within the capacitance forming portion Ac. In addition, if such measurement of the average value expands to 10 dielectric layers, a more generalized average thickness of the dielectric layer may be obtained.

The body 110 may include a plurality of dielectric layers 111 and a plurality of internal electrodes 121 and 122 disposed to face each other in the first direction with each of the dielectric layers 111 interposed therebetween.

The body 110 may include a capacitance forming portion Ac disposed in the body 110 and including a plurality of internal electrodes 121 and 122 disposed to face each other in the first direction with each of the dielectric layers 111 interposed therebetween, and cover portions 112 and 113 disposed on both end surfaces of the capacitance forming portion Ac in the first direction, respectively.

In addition, the capacitance forming portion Ac, which contributes to forming a capacitance of the capacitor, may be formed by repeatedly stacking a plurality of first and second internal electrodes 121 and 122 with each of the dielectric layers 111 interposed therebetween. In addition, the capacitance forming portion Ac may refer to a region in which the plurality of internal electrodes 121 and 122 overlap each other. Referring to FIG. 2, the capacitance forming portion Ac may refer to a space from an uppermost internal electrode to a lowermost internal electrode in the first direction, excluding a margin portion in the second direction in which only the first internal electrodes 121 or the second internal electrodes 122 are disposed, such that the first internal electrodes do not overlap the second internal electrodes.

The cover portions 112 and 113 may include an upper cover portion 112 disposed on an upper surface of the capacitance forming portion Ac in the first direction and a lower cover portion 113 disposed on a lower surface of the capacitance forming portion Ac in the first direction.

The upper cover portion 112 and the lower cover portion 113 may be formed by stacking a single dielectric layer or two or more dielectric layers on the upper and lower surfaces of the capacitance forming portion Ac, respectively, in the thickness direction, and may basically serve to prevent the internal electrodes from being damaged due to physical or chemical stress.

The upper cover portion 112 and the lower cover portion 113 may include the same material as the dielectric layers 111, while not including internal electrodes.

That is, the upper cover portion 112 and the lower cover portion 113 may include a ceramic material, e.g., a barium titanate ($BaTiO_3$)-based ceramic material.

Meanwhile, it is not necessary to particularly limit an average thickness of each of the cover portions 112 and 113. However, in order to more easily achieve the decrease in size of the multilayer electronic component and the increase in capacitance of the multilayer electronic component, the average thickness of each of the cover portions 112 and 113 may be 15 μm or less. The average thickness of each of the cover portions 112 and 113 may refer to a size of each of the cover portions 112 and 113 in the first direction, and may be a value obtained by averaging sizes of each of the cover portions 112 and 113 measured in the first direction from five equally-spaced points of each of the upper and lower surfaces of the capacitance forming portion Ac. The thickness of the cover portions may be determined from an scanning electron micrograph of the cover portion. Other methods and/or tools appreciated by one of ordinary skill in the art, even if not described in the present disclosure, may also be used.

In addition, margin portions 114 and 115 may be disposed on side surfaces of the capacity forming portion Ac.

The margin portions 114 and 115 may include a margin portion 114 disposed on the fifth surface 5 of the body 110 and a margin portion 115 disposed on the sixth surface 6 of the body 110. That is, the margin portions 114 and 115 may be disposed on opposite side surfaces of the ceramic body 110 in the width direction.

As illustrated in FIG. 3, the margin portions 114 and 115 may refer to regions between both ends of the first and second internal electrodes 121 and 122 and boundary surfaces of the body 110 in a cross-section of the body 110 cut in width and thickness (W-T) directions.

The margin portions 114 and 115 may basically serve to prevent the internal electrodes from being damaged due to physical or chemical stress.

The margin portions 114 and 115 may be formed by applying a conductive paste for forming internal electrodes onto ceramic green sheets except places where the margin portions are to be formed.

Alternatively, in order to suppress unevenness in thickness of the capacitance forming portion Ac due to the internal electrodes 121 and 122, the margin portions 114 and 115 may be formed by cutting a laminate formed by stacking the ceramic green sheets with the conductive paste for forming internal electrodes applied thereonto so that the internal electrodes are exposed to the fifth and sixth surfaces 5 and 6 of the body, and then stacking a single dielectric layer or two or more dielectric layers on opposite side surfaces of the capacitance forming portion Ac in the width direction.

The internal electrodes 121 and 122 may be stacked alternately with the dielectric layers 111.

The internal electrodes 121 and 122 may include first internal electrodes 121 and second internal electrodes 122 having different polarities, and the first and second internal electrodes 121 and 122 may be alternately disposed in the first direction with each of the dielectric layers 111 interposed therebetween.

Referring to FIG. 2, the first internal electrodes 121 may be spaced apart from the fourth surface 4 of the body 110 and exposed through the third surface 3 of the body 110, and the second internal electrodes 122 may be spaced apart from the third surface 3 of the body 110 and exposed through the fourth surface 4 of the body 110. The external electrodes 131 and 132 may be disposed on the third surface 3 and the fourth surface 4 of the body 110, respectively, and connected to the internal electrodes 121 and 122, respectively.

In this case, the first and second internal electrodes 121 and 122 may be electrically disconnected from each other by each of the dielectric layers 111 disposed therebetween.

Referring to FIG. 4, the body 110 may be formed by alternately stacking ceramic green sheets on which the first internal electrodes 121 are printed and ceramic green sheets on which the second internal electrode 122 are printed, followed by sintering.

The internal electrodes 121 and 122 may be stacked until 400 or more layers are formed to realize a high-capacitance multilayer electronic component, but are not limited thereto.

The internal electrodes 121 and 122 may include internal electrodes 121$b$ and 122$b$ that are curved at end portions thereof in the capacitance forming portion Ac and internal electrodes 121$a$ and 122$a$ that are flat in the capacitance forming portion Ac. As the internal electrodes 121$b$ and 122$b$ having curved end portions are disposed in the capacitance forming portion Ac, the capacitance forming portion Ac may be uneven in thickness.

Referring to FIGS. 5 and 6, when F1 denotes a maximum distance from an uppermost internal electrode to an uppermost flat internal electrode in the first direction, F2 denotes a maximum distance from a lowermost internal electrode to a lowermost flat internal electrode in the first direction, and D1 denotes a size of the capacitance forming portion Ac in the first direction at the center thereof in the second direction, (F1+F2)/D1×100 may be 35 or less. As (F1+F2)/D1×100 is 35 or less, a volume occupied by the flat internal electrodes 121$a$ and 122$a$ in the capacitance forming portion Ac may increase, thereby increasing a capacitance per unit volume of the multilayer electronic component, and suppressing a short circuit between the internal electrodes and a decrease in breakdown voltage of the multilayer electronic component. The curved end portions of the internal electrodes 121$b$ and 122$b$ in the capacitance forming portion Ac may result from non-uniformity in thickness of an internal electrode pattern. Therefore, in order to ensure (F1+F2)/D1×100 of 35 or less, it is important to uniformly and smoothly form surfaces of internal electrode patterns printed on a ceramic green sheet. It is not necessary to particularly limit a method of uniformly and smoothly forming surfaces of internal electrode patterns. However, in order to manufacture a multilayer electronic component according to an exemplary embodiment in the present disclosure in an easier way in large quantities while shortening a manufacturing time, the multilayer electronic component may be manufactured by a manufacturing method according to an exemplary embodiment in the present disclosure, which will be described below.

In an exemplary embodiment, when D1 denotes a size of the capacitance forming portion Ac in the first direction at the center thereof in the second direction and D2 denotes a size of the capacitance forming portion Ac in the first direction at an end thereof in the second direction, (D2/D1)×100 may be 96.5 or more. The unevenness in thickness of the capacitance forming portion Ac may mean that, in the cross-section of the multilayer electronic component in the first and second directions, the thickness D2 of the capacitance forming portion Ac at the end thereof in the second direction is smaller than the thickness D1 of the capacitance forming portion Ac at the center thereof in the second direction. When (D2/D1)×100 is 96.5 or more, the unevenness in thickness of the capacitance forming portion can be suppressed, thereby increasing a capacitance per unit volume of the multilayer electronic component, and suppressing a short circuit between the internal electrodes and a decrease in breakdown voltage of the multilayer electronic component.

In an exemplary embodiment, the plurality of internal electrodes 121 and 122 may include a plurality of first internal electrodes 121 connected to the third surface of the body and spaced apart from the fourth surface of the body, and a plurality of second internal electrodes 122 connected to the fourth surface of the body and spaced apart from the third surface of the body. When D3 denotes a size from an uppermost first internal electrode to a lowermost first internal electrode in the first direction among the plurality of first internal electrodes 121 on the third surface of the body, (D3/D1)×100 may be 90 or more.

The unevenness in thickness of the capacitance forming portion may also cause unevenness in thickness of the margin portions in the second direction. According to the present disclosure, since the unevenness in thickness of the capacitance forming portion can be suppressed, (D3/D1)×100 can be secured to 90 or more, thereby making the size of the multilayer electronic component uniform and suppressing a crack. Here, the margin portion in the second direction may refer to a region in which only the first internal electrodes 121 or the second internal electrodes 122 are disposed adjacent to the third or fourth surface of the body.

In an exemplary embodiment, when G1 denotes a distance from an extension line La of an uppermost internal electrode to an end of an internal electrode closest to the uppermost internal electrode in the first direction, and G2 denotes a distance from an extension line La' of a lowermost internal electrode to an end of an internal electrode closest to the lowermost internal electrode in the first direction, [(G1+G2)/D1]×100 may be 2.4 or less. As [(G1+G2)/D1]×100 is 2.4 or less, a volume occupied by the flat internal electrodes 121$a$ and 122$a$ in the capacitance forming portion Ac may increase, thereby increasing a capacitance per unit volume of the multilayer electronic component, and suppressing a short circuit between the internal electrodes and a decrease in breakdown voltage of the multilayer electronic component.

The above-described F1, F2, D1, D2, D3, G1, and G2 may be measured as will be described below.

First, the multilayer electronic component 100 may be polished in the third direction so that its cross-section in the first and second directions is exposed. In this case, when values corresponding to F1, F2, D1, D2, D3, G1, and G2 are measured only once, the multilayer electronic component 100 may be polished up to the center thereof in the third direction.

On the other hand, in order to obtain more general values of F1, F2, D1, D2, D3, G1, and G2, an average of values measured in three cross-sections of the multilayer electronic component 100 in the first and second directions may be each of F1, F2, D1, D2, D3, G1, and G2. In this case, by polishing the multilayer electronic component 100 sequentially to ⅓, ½, and ⅔ points of the multilayer electronic component 100 in the third direction, the three cross-sections of the multilayer electronic component 100 in the first and second directions obtained at the respective points may be observed.

After obtaining an image of the cross-section of the multilayer electronic component 100 in the first and second directions observed at a magnification of 100 using a tool microscope, D1, D2, and D3 may be measured, D1 being a size of the capacitance forming portion Ac in the first direction at the center thereof in the second direction, D2 being a size of the capacitance forming portion Ac in the first direction at an end thereof in the second direction, and D3 being a size from an uppermost first internal electrode to a lowermost first internal electrode in the first direction on the third surface of the body.

Figure 9:
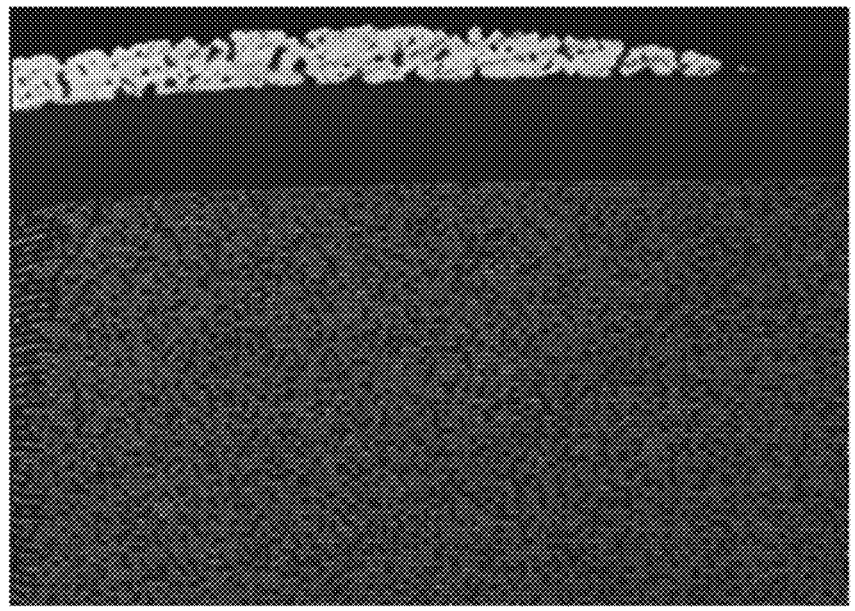
FIG. 9 is an enlarged image of an end portion of the capacitance forming portion in the second direction of FIG. 8.
Figure 11:
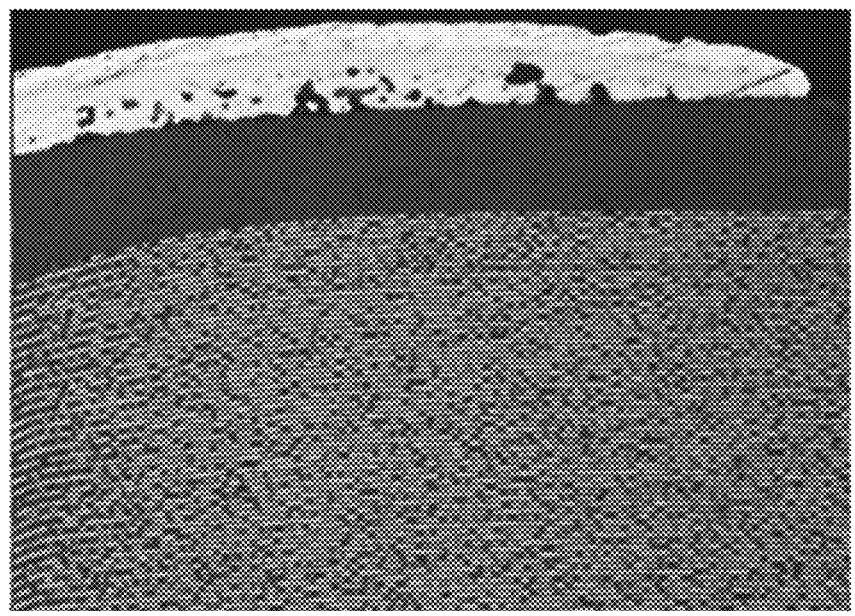
FIG. 11 is an enlarged image of an end portion of the capacitance forming portion in the second direction of FIG. 10.

In addition, an image of an end portion of the capacitance forming portion Ac in the second direction observed at a magnification of 500 using a tool microscope may be obtained in the cross-section of the multilayer electronic component 100 in the first and second directions. As a result, images as shown in FIGS. 9 and 11 may be obtained. Thereafter, referring to FIG. 5, an extension line La of an outermost internal electrode of the capacitance forming portion may be drawn outward of the internal electrode from a center portion of the internal electrode (a center portion of the body in the second direction) using three points P1, P2, and P3 as reference points. In this case, each of intervals between the three points P1, P2, and P3 may be 1 μm. Internal electrode parallel to La may be determined as flat internal electrodes, a distance from La to a flat internal electrode disposed closest to La may be defined as F1, and a distance from La to an end of an internal electrode closest to the uppermost internal electrode in the first direction may be defined as G1.

F2 and G2 may also be measured in the same manner as F1 and G1. Referring to FIG. 6, an extension line La' of an outermost internal electrode of the capacitance forming portion may be drawn outward of the internal electrode from a center portion of the internal electrode (a center portion of the body in the second direction) using three points P1', P2', and P3' as reference points. Then, internal electrode parallel to La' may be determined as flat internal electrodes, a distance from La' to a flat internal electrode disposed closest to La' may be defined as F2, and a distance from La' to an end of an internal electrode closest to the lowermost internal electrode in the first direction may be defined as G2.

Table 1 below describes breakdown voltage (BDV) ratios evaluated by changing (F1+F2)/D1×100.

In Table 1, a BDV ratio was obtained by preparing 100 sample chips for each test number and then calculating an average value of BDVs for the 100 samples, the BDV being a voltage at which a short circuit occurred in the sample chip as its voltage was increased. Using the average value of BDVs in Test No. 1 as a reference value (100%), ratios of average values of BDVs in Test Nos. 2 to 11 were described as BDV ratios.

TABLE 1

| Test No. | (F1 + F2)/ D1 × 100 | (D2/D1) × 100 | (D3/D1) × 100 | [(G1 + G2)/ D1] × 100 | BDV Ratio |
| --- | --- | --- | --- | --- | --- |
| 1 | 5.00 | 97.15 | 92.71 | 0.91 | 100% |
| 2 | 9.99 | 96.99 | 92.41 | 0.93 | 99% |
| 3 | 12.50 | 96.91 | 91.91 | 1.23 | 98% |
| 4 | 15.00 | 96.88 | 91.53 | 1.52 | 97% |
| 5 | 20.00 | 96.85 | 91.22 | 2.31 | 96% |
| 6 | 25.00 | 96.82 | 90.71 | 2.35 | 95% |
| 7 | 30.00 | 96.71 | 90.45 | 2.38 | 93% |
| 8 | 35.00 | 96.50 | 90.00 | 2.42 | 91% |
| 9 | 40.00 | 94.45 | 88.34 | 3.18 | 87% |
| 10 | 47.90 | 93.43 | 85.97 | 3.69 | 83% |
| 11 | 50.00 | 93.10 | 84.81 | 4.13 | 78% |

In each of Test Nos. 1 to 8, where (F1+F2)/D1×100 was 35 or less, (D2/D1)×100 indicating the unevenness in thickness of the capacitance forming portion was 96.5 or more, and it was confirmed therefrom that the unevenness in thickness of the capacitance forming portion was suppressed, and the BDV ratio was superior.

On the other hand, in each of Test Nos. 9 to 11, where (F1+F2)/D1×100 was more than 35, (D2/D1)×100 indicating the unevenness in thickness of the capacitance forming portion was less than 96.5, and it was confirmed therefrom that the capacitance forming portion was uneven, and the BDV ratio was inferior.

Figure 8:
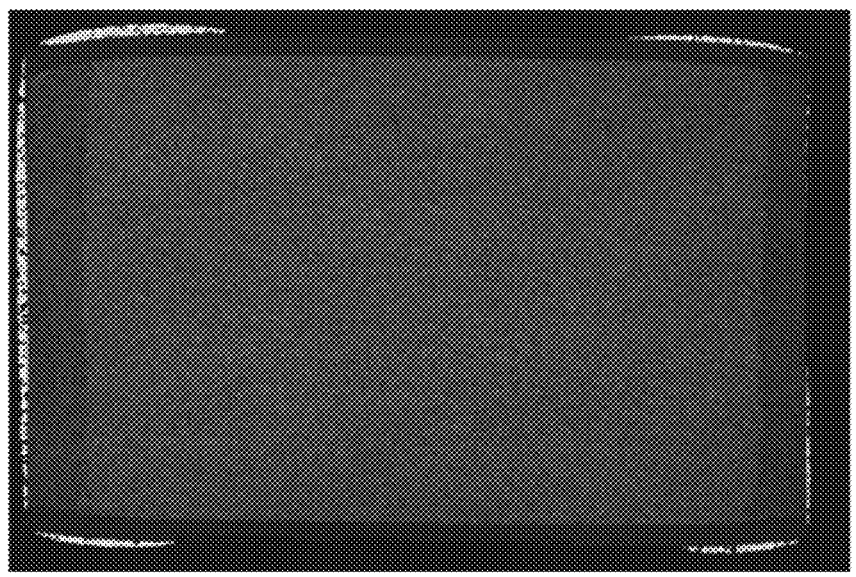
FIG. 8 is an image of a cross-section of a capacitance forming portion in first and second directions observed using a tool microscope in Test No. 2.

FIG. 8 is an image of a cross-section of a capacitance forming portion in the first and second directions observed at a magnification of 100 using a tool microscope in Test No. 2, and FIG. 9 is an image of an end portion of the capacitance forming portion Ac in the second direction observed at a magnification of 500 using a tool microscope in the cross-section of the capacitance forming portion in the first and second directions cut at the center thereof in the third direction in Test No. 2. Referring to FIGS. 8 and 9, it was confirmed that the unevenness in thickness of the capacitance forming portion was small and the distance to the flat internal electrode was small.

Figure 10:
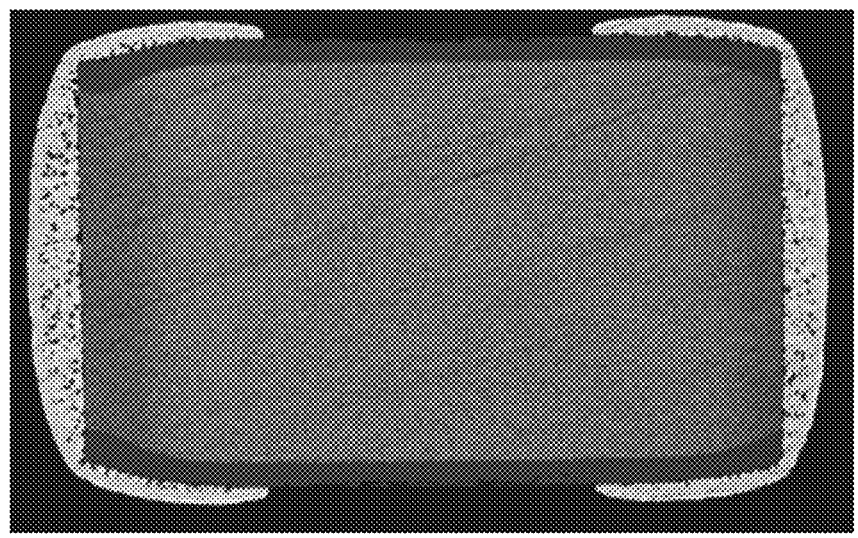
FIG. 10 is an image of a cross-section of a capacitance forming portion in first and second directions observed using a tool microscope in Test No. 10.

FIG. 10 is an image of a cross-section of a capacitance forming portion in the first and second directions observed at a magnification of 100 using a tool microscope in Test No. 10, and FIG. 11 is an image of an end portion of the capacitance forming portion Ac in the second direction observed at a magnification of 500 using a tool microscope in the cross-section of the capacitance forming portion in the first and second directions cut at the center thereof in the third direction in Test No. 10. Referring to FIGS. 10 and 11, it was confirmed that the unevenness in thickness of the capacitance forming portion was large and the distance to the flat internal electrode was large.

In an exemplary embodiment, in the internal electrodes 121b and 122b that are curved at end portions thereof in the capacitance forming portion Ac, the end portions may be curved toward the center of the capacitance forming portion in the first direction.

In an exemplary embodiment, internal electrodes having end portions curved downward in the first direction may be disposed in an upper portion of the capacitance forming portion Ac in the first direction, internal electrodes having end portions curved upward in the first direction may be disposed in a lower portion of the capacitance forming portion Ac in the first direction, and flat internal electrodes may be disposed at a central portion of the capacitance forming portion Ac in the first direction.

In an exemplary embodiment, each of the internal electrodes 121 and 122 may have an internal electrode connectivity of 80% or more. If the internal electrode connectivity is less than 80%, there is concern that reliability may decrease and capacitance may decrease.

Figure 7:
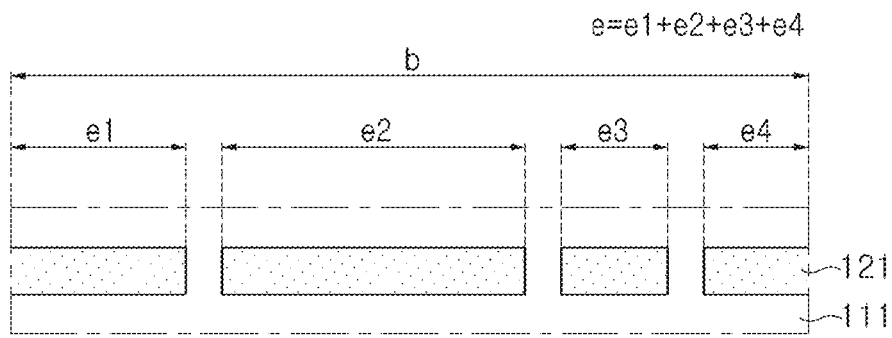
FIG. 7 is an enlarged view of region P of FIG. 2.

Here, the internal electrode connectivity may be defined as a ratio of a length of a portion where the internal electrode is actually formed to an overall length of the internal electrode. For example, when an overall length of the internal electrode 121 measured within a certain section thereof is defined as b, and lengths of portions in which the internal electrode 121 is actually formed within the section are defined as e1, e2, e3, and e4, respectively, as illustrated in FIG. 7, the internal electrode connectivity may be expressed as e/b, which is a value obtained by dividing the sum of the lengths (e=e1+e2+e3+e4) of the portions in which the internal electrode is actually formed by the overall length b of the internal electrode. The internal electrode connectivity may be an average value of internal electrode connectivities measured in four arbitrary regions each having a size of 70 μm×90 μm in a cross-section of the multilayer electronic component 100 in the first and second directions. For example, a scanning electron microscope (SEM) may be used to determine the lengths b, e1, e2, e3, and e4. Other methods and/or tools appreciated by one of ordinary skill in the art, even if not described in the present disclosure, may also be used.

Meanwhile, a material for forming the internal electrodes 121 and 122 is not particularly limited, and may be a material having excellent electrical conductivity. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and an alloy thereof.

In addition, the internal electrodes 121 and 122 may be formed by printing a conductive paste for internal electrodes including one or more of nickel (Ni), copper (Cu), palladium (Pd), silver (Ag), gold (Au), platinum (Pt), tin (Sn), tungsten (W), titanium (Ti), and an alloy thereof on ceramic green sheets. The conductive paste for internal electrodes may be printed using a screen-printing method, a gravure printing method, or the like, but the method of printing the conductive paste is not limited thereto.

In addition, it is not necessary to particularly limit an average thickness te of each of the internal electrodes 121 and 122. For example, the average thickness te of each of the internal electrodes 121 and 122 may be 0.2 μm or more and 2 μm or less.

However, in general, when the internal electrodes are formed to have a small thickness of less than 0.6 μm, in particular 0.4 μm or less, there is concern that reliability may decrease.

According to an exemplary embodiment in the present disclosure, since the unevenness in thickness of the capacitance forming portion can be suppressed, it is possible to secure excellent reliability even when the average thickness of each of the internal electrodes 121 and 122 is 0.4 μm or less.

Therefore, when the average thickness of each of the internal electrodes 121 and 122 is 0.4 μm or less, the effect according to the present disclosure can be more remarkable, and it is possible to easily achieve the decrease in size of the multilayer electronic component and the increase in capacitance of the multilayer electronic component. Accordingly, the average thickness te of each of the internal electrodes 121 and 122 may be preferably 0.4 μm or less, and more preferably 0.35 μm or less.

The average thickness te of each of the internal electrodes 121 and 122 may refer to an average thickness of each of the first and second internal electrodes 121 and 122.

The average thickness of each of the internal electrodes 121 and 122 may be measured from an image obtained by scanning a cross-section of the body 110 in the length and thickness (L-T) directions with a scanning electron microscope (SEM) having a magnification of 10,000. More specifically, thicknesses of one internal electrode at 30 points equally spaced in the length direction may be measured from the scanned image to obtain an average value. The equally-spaced 30 points may be chosen within the capacitance forming portion Ac. In addition, if such measurement of the average value expands to 10 internal electrodes, a more generalized average thickness of the internal electrode may be obtained.

The external electrodes 131 and 132 may be disposed on the third surface 3 and the fourth surface 4 of the body 110, respectively.

The external electrodes 131 and 132 may include first and second external electrodes 131 and 132 disposed on the third and fourth surfaces 3 and 4 of the body 110, respectively, and connected to the first and second internal electrodes 121 and 122, respectively.

Referring to FIG. 1, the external electrodes 131 and 132 may be disposed to cover opposite end surfaces of the side margin portions 114 and 115 in the second direction.

Although it is described in the present exemplary embodiment that the multilayer electronic component 100 includes two external electrodes 131 and 132, the number, the shape, and the like of external electrodes 131 and 132 may be modified depending on shapes of the internal electrodes 121 and 122 or other purposes.

Meanwhile, the external electrodes 131 and 132 may be formed using any type of material as long as it has electrical conductivity, such as a metal, and a specific material for forming the external electrodes 131 and 132 may be determined in consideration of electrical characteristics, structural stability, etc. Furthermore, the external electrodes 131 and 132 may have a multilayer structure.

For example, the external electrodes 131 and 132 may include electrode layers 131a and 132a disposed on the body 110, and plating layers 131b and 132b formed on the electrode layers 131a and 132a, respectively.

As a more specific example of the electrode layers 131a and 132a, each of the electrode layers 131a and 132a may be a fired electrode including a conductive metal and a glass or a resin-based electrode including a conductive metal or a resin.

Alternatively, each of the electrode layers 131a and 132a may be formed by sequentially stacking a fired electrode and a resin-based electrode on the body. In addition, each of the electrode layers 131a and 132a may be formed by transferring a sheet including a conductive metal onto the body or by transferring a sheet including a conductive metal onto a fired electrode.

Alternatively, each of the electrode layers 131a and 132a may be formed using an atomic layer deposition (ALD) method, a molecular layer deposition (MLD) method, a chemical vapor deposition (CVD) method, a sputtering method, or the like.

The conductive metal used for the electrode layers 131a and 132a is not particularly limited as long as it is a material that can be electrically connected to the internal electrodes to form a capacitance, and may include, for example, one or more selected from the group consisting of nickel (Ni), copper (Cu), palladium (Pd), silver (Ag), gold (Au), platinum (Pt), tin (Sn), tungsten (W), titanium (Ti), and an alloy thereof.

The plating layers 131b and 132b may serve to improve mounting characteristics of the multilayer electronic component. The type of material for forming the plating layers 131b and 132b is not particularly limited, and may include one or more of Ni, Sn, Pd, and an alloy thereof. Also, each of the plating layers 131b and 132b may be formed as a plurality of layers.

As a more specific example of the plating layers 131b and 132b, each of the plating layers 131b and 132b may be a Ni plating layer or a Sn plating layer, or may be formed by sequentially stacking a Ni plating layer and a Sn plating layer on each of the electrode layers 131a and 132a or by sequentially stacking a Sn plating layer, a Ni plating layer, and a Sn plating layer on each of the electrode layers 131a and 132a. Alternatively, each of the plating layers 131b and 132b may include a plurality of Ni plating layers and/or a plurality of Sn plating layers.

It is not necessary to particularly limit a size of the multilayer electronic component 100.

However, in order to achieve both the decrease in size and the increase in capacitance of the multilayer electronic component, it is required to increase the number of dielectric layers and internal electrodes stacked by decreasing the thicknesses of the dielectric layers and the internal electrodes. According to the present disclosure, the multilayer electronic component 100 may have more remarkable effects in improving reliability and increasing a breakdown voltage, when the multilayer electronic component 100 has a size of 0603 (length×width=0.6 mm×0.3 mm) or less.

Therefore, considering manufacturing errors, sizes of external electrodes, etc., when the multilayer electronic component 100 has a length of 0.66 mm or less and a width of 0.33 mm or less, the reliability improving effect according to the present disclosure may be more remarkable. Here, the length of the multilayer electronic component 100 may refer to a maximum size of the multilayer electronic component 100 in the second direction, and the width of the multilayer electronic component 100 may refer to a maximum size of the multilayer electronic component 100 in the third direction. The dimensions of the multilayer electronic component may be measured using a tool microscope or an optical microscope. Other methods and/or tools appreciated by one of ordinary skill in the art, even if not described in the present disclosure, may also be used.

Method of Manufacturing Multilayer Electronic Component

A method of manufacturing the above-described multilayer electronic component according to an exemplary embodiment in the present disclosure in an easier way in large quantities while shortening a manufacturing time will be described below.

However, it should be noted that the method of manufacturing the above-described multilayer electronic component according to an exemplary embodiment in the present disclosure is not limited to the manufacturing method to be described below.

Figure 12:
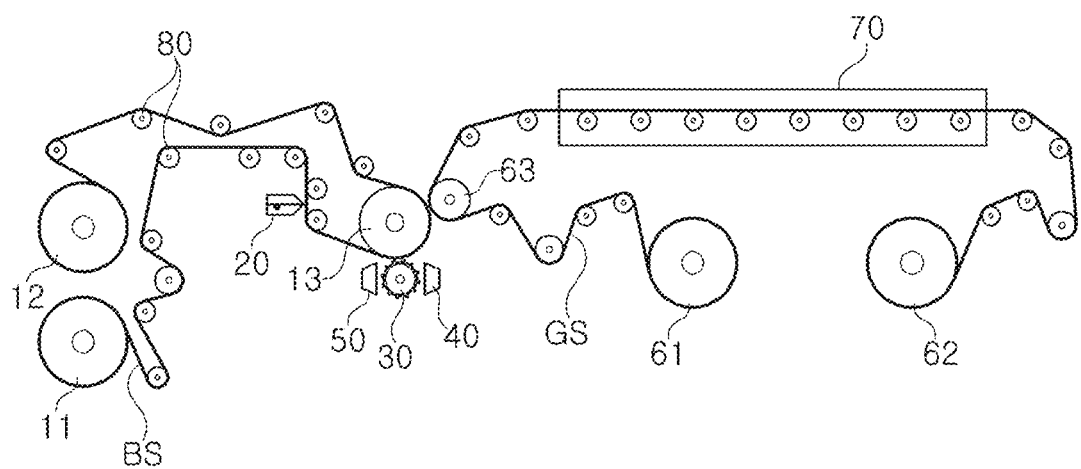
FIG. 12 is a schematic perspective view illustrating a method of manufacturing a multilayer electronic component according to an exemplary embodiment in the present disclosure.

FIG. 12 is a schematic perspective view illustrating a method of manufacturing a multilayer electronic component according to an exemplary embodiment in the present disclosure.

Figure 13:
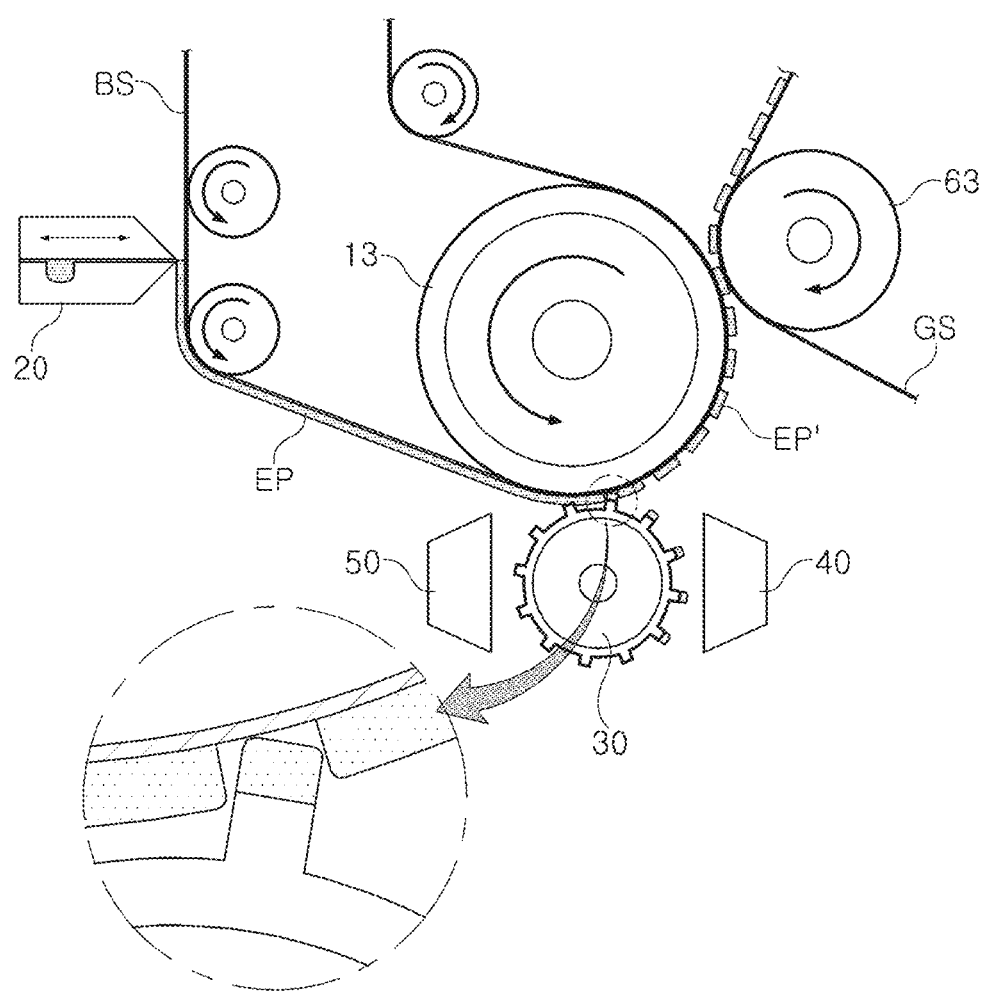
FIG. 13 is a partial enlarged view of FIG. 12.

FIG. 13 is a partial enlarged view of FIG. 12.

Figure 14:
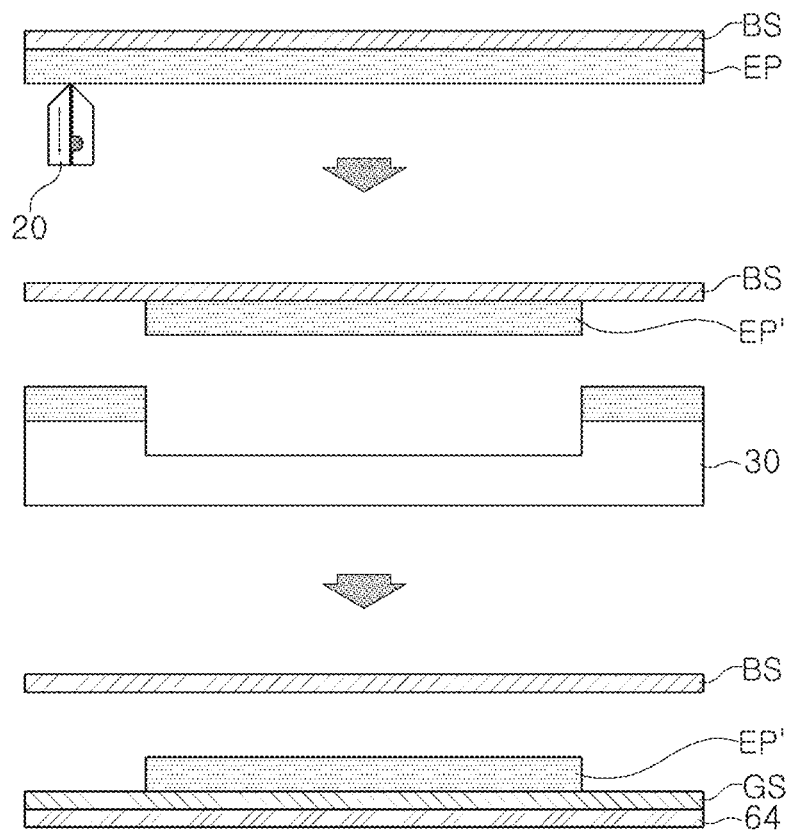
FIG. 14 is a schematic perspective view illustrating reverse offset printing.

FIG. 14 is a schematic perspective view illustrating reverse offset printing.

Figure 15:
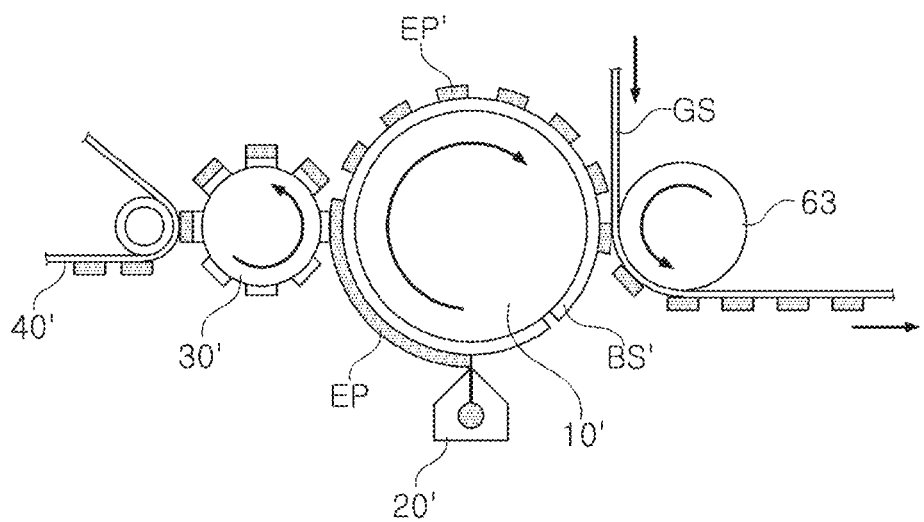
FIG. 15 is a schematic perspective view illustrating conventional reverse offset printing.

FIG. 15 is a schematic perspective view illustrating conventional reverse offset printing.

A method of manufacturing a multilayer electronic component according to an exemplary embodiment in the present disclosure will be described in detail with reference to FIGS. 12 through 15.

A method of manufacturing a multilayer electronic component according to an exemplary embodiment in the present disclosure may include: applying an internal electrode paste EP onto continuously supplied sheets BS; forming internal electrode patterns EP' by partially removing the internal electrode paste applied onto the sheets; printing the internal electrode patterns EP' on ceramic green sheets GS by transferring the internal electrode patterns EP' onto the continuously supplied ceramic green sheets; forming a laminate by stacking the ceramic green sheets GS on which the internal electrode patterns EP' are printed; obtaining a unit laminate by cutting the laminate; obtaining a body by sintering the unit laminate; and obtaining a multilayer electronic component by forming external electrodes on the body.

The internal electrode patterns may be printed on ceramic green sheets by a gravure printing method, a screen-printing method, a reverse offset printing method, or the like.

FIG. 14 is a schematic perspective view illustrating reverse offset printing.

Referring to FIG. 14, in the reverse offset printing method, an internal electrode paste EP may be applied onto an entire surface of a blanket sheet BS. Thereafter, the internal electrode paste EP applied may be partially removed by a cliché roll 30 to form internal electrode patterns EP'. Thereafter, the internal electrode patterns EP' may be transferred onto a ceramic green sheet GS to print the internal electrode patterns EP' on the ceramic green sheet.

The reverse offset printing, which is different from the gravure printing and the screen-printing in that the internal electrode paste EP is applied onto the entire surface of the blanket sheet BS without using a mesh mask or a halftone design, is advantageously capable of uniformly and smoothly applying the paste.

However, referring to FIG. 15, which is a schematic perspective view illustrating conventional reverse offset printing, the conventional reverse offset printing is intermittent printing, rather than continuous printing. In the intermittent printing method, a blanket sheet BS' is wrapped around a circular blanket roll 10', an internal electrode paste EP is applied onto a surface of the blanket sheet BS', internal electrode patterns EP' are formed using a cliché roll 30', and then the internal electrode patterns EP' formed on the surface of the blanket sheet BS' are transferred onto a ceramic green sheet GS.

The conventional reverse offset printing is suitable for low-speed printing but is not suitable for high-speed printing, and thus has a problem in that a manufacturing time increases, resulting in a decrease in productivity.

In addition, in the conventional reverse offset printing method, the blanket sheet BS' wrapped around the circular blanket roll 10' is repeatedly reused, which may cause changes in surface characteristics of the blanket sheet BS'. Thus, there has been concern that the surface of the blanket sheet BS' may not be kept in constant conditions, resulting in deteriorations in uniformity and smoothness of the internal electrode patterns EP'. Specifically, there has been concern that the repeated reuse of the blanket sheet BS' may continuously increase the likelihood of foreign substances being generated on the surface of the blanket sheet BS' and the likelihood of the internal electrode paste EP remaining on the surface of the blanket sheet BS', resulting in deteriorations in uniformity and smoothness of the internal electrode patterns EP'. In addition, the blanket sheet may serve to transfer the internal electrode paste EP in a dry state by absorbing a solvent in the internal electrode paste EP, but the repeated reuse of the blanket sheet BS' may cause a problem that such an effect may be gradually reduced.

In contrast, in the manufacturing method according to an exemplary embodiment in the present disclosure, since the sheets BS are supplied continuously, the sheets BS are not reused, thereby solving the above-described problem of the conventional reverse offset printing. That is, the manufacturing method according to an exemplary embodiment in the present disclosure is capable of not only high-speed printing but also constantly maintaining the surface characteristics of the sheets BS, thereby improving the uniformity and the smoothness of the internal electrode patterns. In addition, by absorbing a solvent in the internal electrode paste EP, the sheets BS is capable of serving to transfer the internal electrode paste EP in a dry state, thereby minimizing the fluidity of the internal electrode paste EP without requiring a separate drying process to improve the uniformity and the smoothness of the internal electrode patterns EP'.

Hereinafter, the manufacturing method according to an exemplary embodiment in the present disclosure will be described based on each step.

Application of Internal Electrode Paste

An internal electrode paste EP may be applied onto the continuously supplied sheets BS.

According to an exemplary embodiment in the present disclosure, since the sheets BS are supplied continuously, printing can be performed at a high speed, and the surface characteristics of the sheets BS can be constantly maintained, thereby improving the uniformity and the smoothness of the internal electrode patterns EP'. In addition, by absorbing a solvent in the internal electrode paste EP, the sheets BS is capable of serving to transfer the internal electrode paste EP in a dry state, thereby minimizing the fluidity of the internal electrode paste EP without requiring a separate drying process to improve the uniformity and the smoothness of the internal electrode patterns EP'.

It is not necessary to particularly limit a method of continuously supplying the sheets BS.

In an exemplary embodiment, the sheets BS may be continuously supplied by moving from a roll 11 around which the sheets are wound to a roll 12 for rewinding the sheets. In an intermediate region in which the sheets BS move from the roll 11 around which the sheets BS are wound to the roll 12 for rewinding the sheets BS, moving rolls 80 may be disposed to stably supply the sheets BS.

In this case, the sheets BS may be blanket sheets. It is not necessary to particularly limit the type of blanket sheet, and a typical blanket sheet of a generally used material may be used.

A method of applying the internal electrode paste EP is not particularly limited. For example, the internal electrode paste EP may be applied using a die coater 20. The die coater 20 may apply the internal electrode paste EP onto the sheet through a slit, and a thickness of the internal electrode paste EP to be applied onto the sheet BS may be regulated by adjusting a distance between the die coater 20 and the sheet BS.

Formation of Internal Electrode Patterns

Thereafter, internal electrode patterns EP' may be formed by partially removing the internal electrode paste applied onto the sheets BS.

In this case, the internal electrode patterns EP' may be formed by partially removing the internal electrode paste applied onto the sheet using a cliché roll 30.

The cliché roll 30 may have concave portions corresponding to the internal electrode patterns and convex portions corresponding to regions to be removed of the internal electrode paste.

The blanket sheet onto which the internal electrode paste is applied may pass between the cliché roll 30 and a blanket roll 10, and the cliché roll 30 may rotate in a direction opposite to a direction in which the blanket roll 10 rotates to apply a pressure on the internal electrode paste, so that a partial portion of the internal electrode paste is attached to the convex portion of the cliché roll 30 for removal. Then, the internal electrode patterns EP' may be formed.

A washing means 40 and a drying means 50 may be disposed on both sides of the cliché roll 30. The internal electrode paste attached to the convex portion of the cliché roll 30 may be removed by the washing means 40, and the washed cliché roll may be dried by the drying means 50.

Printing of Internal Electrode Patterns

Thereafter, the internal electrode patterns EP' may be printed on ceramic green sheets GS by transferring the internal electrode patterns EP' disposed on the sheets BS onto the continuously supplied ceramic green sheets GS.

The ceramic green sheets GS may be continuously supplied by moving from a roll 61 around which the ceramic green sheets GS are wound to a roll 62 for rewinding the ceramic green sheets GS. In an intermediate region in which the ceramic green sheets move from the roll 61 around which the ceramic green sheets are wound to the roll 62 for rewinding the ceramic green sheets, moving rolls may be disposed to stably supply the ceramic green sheets GS. The ceramic green sheet GS may be disposed on a base film 64.

The sheet BS on which the internal electrode patterns EP' are disposed may pass between the blanket roll 10 and a pressure roll 63, and the pressure roll 63 may rotate in the direction opposite to the direction in which the blanket roll 10 rotates to apply a pressure on the internal electrode patterns EP'. Then, the internal electrode patterns EP' may be transferred onto the ceramic green sheets GS.

Thereafter, the ceramic green sheets GS on which the internal electrode patterns EP' are printed may be dried by passing through a drying device.

In an exemplary embodiment, a thickness deviation of the internal electrode patterns EP' may be 0.1 µm or less. By setting the thickness deviation of the internal electrode patterns EP' to 0.1 µm or less, the internal electrodes 121 and 122 can be formed to have excellent smoothness while securing more uniform connectivities between the internal electrodes after being sintered.

Figure 16:
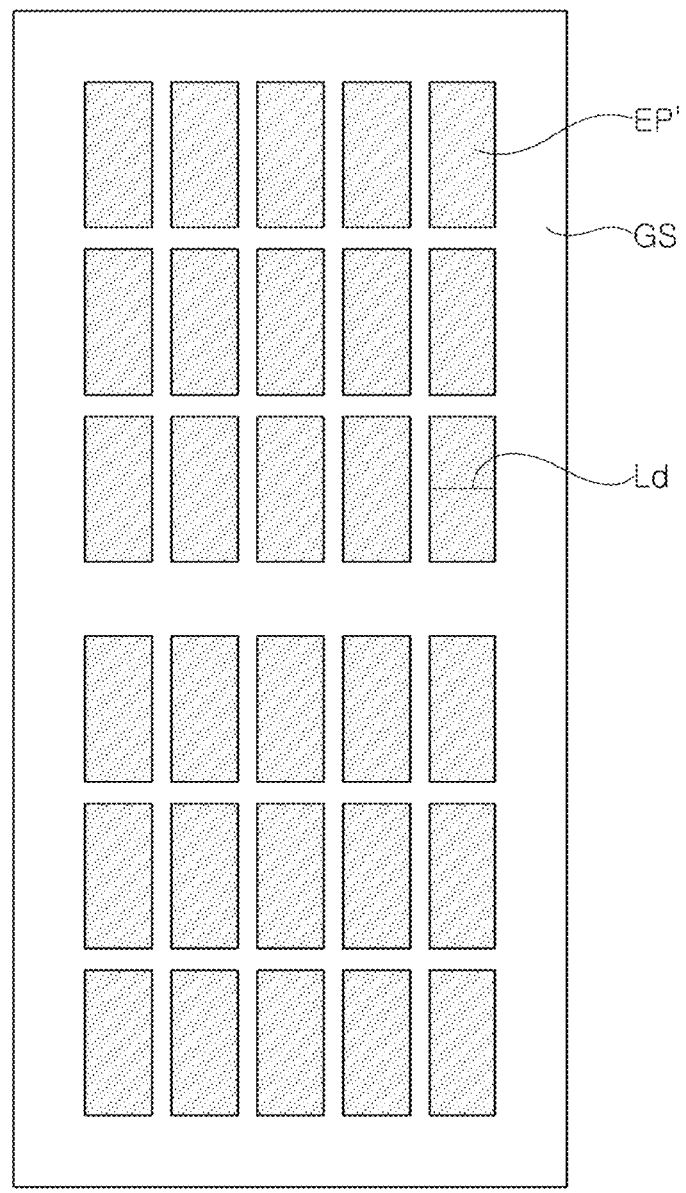
FIG. 16 illustrates a ceramic green sheet on which internal electrode patterns are printed.
Figure 17:
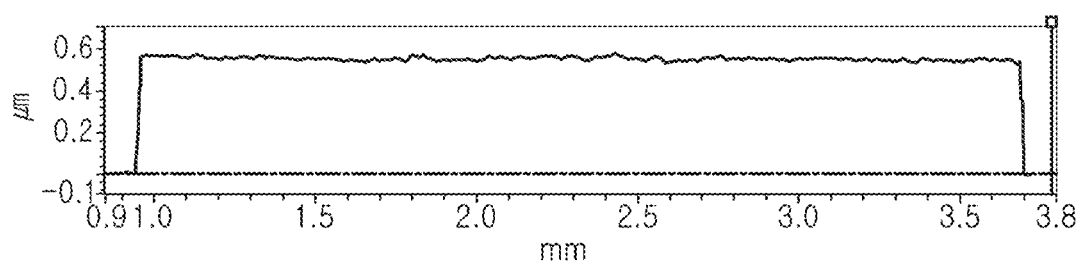
FIG. 17 is a graph illustrating thicknesses of an internal electrode pattern measured along a dotted line Ld of FIG. 16 when the internal electrode patterns are printed by a manufacturing method according to the present disclosure.

Referring to FIG. 16, which is a top view of the ceramic green sheet GS on which the internal electrode patterns EP' are printed, and FIG. 17, which is a graph illustrating thicknesses of an internal electrode pattern measured along a dotted line Ld of FIG. 16 when the internal electrode patterns EP' are printed by the manufacturing method according to the present disclosure, it was confirmed that a difference between a maximum thickness and a minimum thickness of the internal electrode pattern EP' was 0.1 µm or less, indicating that the thicknesses of the internal electrode pattern were very uniform.

Figure 18:
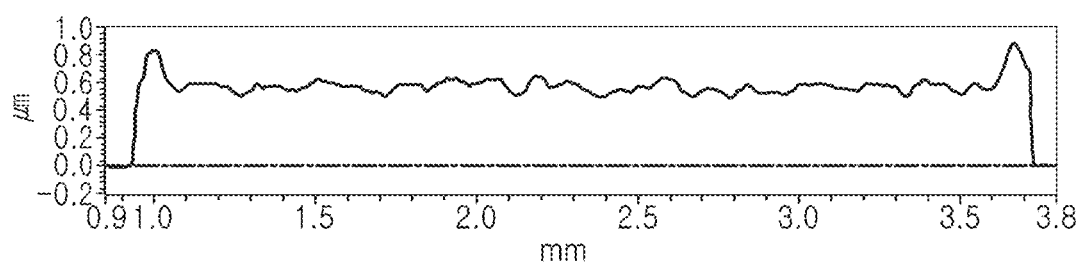
FIG. 18 is a graph illustrating thicknesses of an internal electrode pattern measured along a dotted line Ld of FIG. 16 when the internal electrode patterns are printed by a gravure printing method.

In contrast, referring to FIG. 18, which is a graph illustrating thicknesses of an internal electrode pattern measured along a dotted line Ld of FIG. 16 when the internal electrode patterns are printed by the gravure printing method, it was confirmed that a saddle phenomenon, in which end portions of the internal electrode pattern were thicker than a central portion of the internal electrode pattern, occurred, and a difference between a maximum thickness and a minimum thickness of the internal electrode pattern was 0.2 µm or more, indicating that the thicknesses of the internal electrode pattern were not uniform.

It is not necessary to particularly limit an average thickness of each of the internal electrode patterns EP', and an average thickness of each of the internal electrode patterns EP' may be determined in consideration of a desired thickness of each of the internal electrodes to be obtained.

However, in general, when the internal electrodes are formed to have a small thickness of less than 0.6 µm, in particular 0.4 µm or less, there is concern that reliability may decrease.

According to an exemplary embodiment in the present disclosure, since the internal electrode patterns EP' have a uniform thickness with excellent smoothness, it is possible to obtain internal electrodes having a uniform internal electrode connectivity with excellent smoothness, thereby securing excellent reliability even when the average thickness of each of the internal electrodes after being sintered is 0.4 µm or less.

Therefore, by controlling an average thickness of each of the internal electrode patterns EP', when the average thickness of each of the internal electrodes after being sintered is 0.4 µm or less, the effect according to the present disclosure can be more remarkable, and it is possible to easily achieve the decrease in size of the multilayer electronic component and the increase in capacitance of the multilayer electronic component.

It is also not necessary to particularly limit an average thickness of each of the ceramic green sheets GS, and an average thickness of each of the ceramic green sheets GS may be determined in consideration of a desired thickness of each of the dielectric layers to be obtained.

However, according to an exemplary embodiment in the present disclosure, since the internal electrode patterns EP' have a uniform thickness with excellent smoothness, it is possible to obtain internal electrodes having a uniform internal electrode connectivity with excellent smoothness, and it is also possible to secure excellent reliability even when the average thickness of each of the dielectric layers 111 is 0.45 µm or less.

Therefore, by controlling an average thickness of each of the ceramic green sheets GS, when the average thickness of each of the dielectric layers 111 after being sintered is 0.45 µm or less, the effect according to the present disclosure can be more remarkable, and it is possible to easily achieve the decrease in size of the multilayer electronic component and the increase in capacitance of the multilayer electronic component.

Formation of Body

Thereafter, a laminate may be formed by stacking the ceramic green sheets GS on which the internal electrode patterns EP' are printed. The laminate may be pressed in a stacking direction (first direction) for compression.

Thereafter, a unit laminate may be obtained by cutting the laminate to a size corresponding to a body of one multilayer electronic component. At this time, the laminate may be cut so that one ends of the internal electrode patterns are exposed alternately through both end surfaces of the laminate in the second direction.

Thereafter, a body 110 may be obtained by sintering the unit laminate.

Formation of External Electrodes

Thereafter, a multilayer electronic component 100 may be manufactured by forming external electrodes 131 and 132 on the body 110.

A method of forming the external electrodes 131 and 132 is not particularly limited, and each of the external electrodes 131 and 132 may be formed by dipping the body into a paste including a conductive metal and a glass or by transferring a sheet including a conductive metal onto the body. Alternatively, each of the external electrodes may be formed using a paste including conductive metal and a resin, or using an atomic layer deposition (ALD) method, a molecular layer deposition (MLD) method, a chemical vapor deposition (CVD) method, a sputtering method, or the like.

In addition, a plating process may be additionally performed so that the external electrodes include plating layers 131b and 132b, respectively.

As set forth above, according to the exemplary embodiment in the present disclosure, the reliability of the multilayer electronic component can be improved by suppressing the unevenness in thickness of the capacitance forming portion.

In addition, a capacitance per unit volume of the multilayer electronic component can be improved by suppressing the unevenness in thickness of the capacitance forming portion.

In addition, it is possible to provide a highly reliable multilayer electronic component having a small size and a high capacitance.

Various and beneficial advantages and effects of the present disclosure are not limited to those described above, and may be more easily understood from the description of the exemplary embodiments in the present disclosure.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including a plurality of dielectric layers and a plurality of internal electrodes alternately disposed with the dielectric layers in a first direction, and having first and second surfaces opposing each other in the first direction, third and fourth surfaces connected to the first and second surfaces and opposing each other in a second direction, and fifth and sixth surfaces connected to the first to fourth surfaces and opposing each other in a third direction; and
external electrodes disposed on the body,
wherein:
when a region in which the plurality of internal electrodes overlap each other in the first direction is defined as a capacitance forming portion, the plurality of internal electrodes include internal electrodes that are curved at end portions thereof in the capacitance forming portion and internal electrodes that are flat in the capacitance forming portion, in a cross-section of the body in the first and second directions, (F1+F2)/D1×100 is 35 or less, where F1 is a maximum distance from an uppermost internal electrode to an uppermost flat internal electrode in the first direction, F2 is a maximum distance from a lowermost internal electrode to a lowermost flat internal electrode in the first direction, and D1 is a size of the capacitance forming portion in the first direction at a center thereof in the second direction, and the external electrodes include first and second external electrodes disposed on the third and fourth surfaces, respectively, and the plurality of internal electrodes includes the first internal electrodes connected to the first external electrode at the third surface, and second internal electrodes connected to the second external electrode at the fourth surface.

2. The multilayer electronic component of claim 1, wherein (D2/D1)×100 is 96.5 or more, where D1 is the size of the capacitance forming portion in the first direction at the center thereof in the second direction, and D2 is a size of the capacitance forming portion in the first direction at an end thereof in the second direction.

3. The multilayer electronic component of claim 2, wherein the first internal electrodes are spaced apart from the fourth surface of the body, and the second internal electrodes are spaced apart from the third surface of the body, and (D3/D1)×100 is 90 or more, where D3 is a size from an uppermost first internal electrode to a lowermost first internal electrode in the first direction on the third surface of the body.

4. The multilayer electronic component of claim 1, wherein [(G1+G2)/D1]×100 is 2.4 or less, where G1 is a distance from an extension line of the uppermost internal electrode to an end of an internal electrode closest to the uppermost internal electrode in the first direction, and G2 is a distance from an extension line of the lowermost internal electrode to an end of an internal electrode closest to the lowermost internal electrode in the first direction.

5. The multilayer electronic component of claim 1, wherein in the internal electrodes that are curved at end portions thereof in the capacitance forming portion, the end portions are curved toward the center of the capacitance forming portion in the first direction.

6. The multilayer electronic component of claim 1, wherein internal electrodes having end portions curved downward in the first direction are disposed in an upper portion of the capacitance forming portion in the first direction, internal electrodes having end portions curved upward in the first direction are disposed in a lower portion of the capacitance forming portion in the first direction, and flat internal electrodes are disposed at a central portion of the capacitance forming portion in the first direction.

7. The multilayer electronic component of claim 1, wherein each of the internal electrodes has an internal electrode connectivity of 80% or more, the internal electrode connectivity being a ratio of a length of a portion where the internal electrode is actually present to an overall length of the internal electrode.

8. The multilayer electronic component of claim 1, wherein each of the internal electrodes has an average thickness of 0.4 μm or less.

9. The multilayer electronic component of claim 1, wherein each of the dielectric layers has an average thickness of 0.45 μm or less.

10. The multilayer electronic component of claim 1, further comprising cover portions disposed on both end surfaces of the capacitance forming portion in the first direction, respectively.

11. The multilayer electronic component of claim 10, wherein each of the cover portions has an average thickness of 15 μm or less.

12. The multilayer electronic component of claim 1, wherein a maximum size of the multilayer electronic component in the second direction is 0.66 mm or less, and a maximum size of the multilayer electronic component in the third direction is 0.33 mm or less.

13. A multilayer electronic component comprising:
a body including a plurality of dielectric layers and a plurality of internal electrodes alternately disposed with the dielectric layers in a first direction, and having first and second surfaces opposing each other in the first direction, third and fourth surfaces connected to the first and second surfaces and opposing each other in a second direction, and fifth and sixth surfaces connected to the first to fourth surfaces and opposing each other in a third direction; and
external electrodes disposed on the body,
wherein when a region in which the plurality of internal electrodes overlap each other in the first direction is defined as a capacitance forming portion, the plurality of internal electrodes include internal electrodes that are curved at end portions thereof in the capacitance forming portion and internal electrodes that are flat in the capacitance forming portion, and in a cross-section of the body in the first and second directions, (F1+F2)/D1×100 is 35 or less, where F1 is a maximum distance from an uppermost internal electrode to an uppermost flat internal electrode in the first direction, F2 is a maximum distance from a lowermost internal electrode to a lowermost flat internal electrode in the first direction, and D1 is a size of the capacitance forming portion in the first direction at a center thereof in the second direction, and (D2/D1)×100 is 96.5 or more, where D1 is the size of the capacitance forming portion in the first direction at the center thereof in the second direction, and D2 is a size of the capacitance forming portion in the first direction at both ends thereof in the second direction.

14. The multilayer electronic component of claim 13, wherein the first internal electrodes are spaced apart from the fourth surface of the body, and the second internal electrodes are spaced apart from the third surface of the body, and (D3/D1)×100 is 90 or more, where D3 is a size from an uppermost first internal electrode to a lowermost first internal electrode in the first direction on the third surface of the body.

15. The multilayer electronic component of claim 13, wherein [(G1+G2)/D1]×100 is 2.4 or less, where G1 is a distance from an extension line of the uppermost internal electrode to an end of an internal electrode closest to the uppermost internal electrode in the first direction, and G2 is a distance from an extension line of the lowermost internal electrode to an end of an internal electrode closest to the lowermost internal electrode in the first direction.

16. The multilayer electronic component of claim 13, wherein in the internal electrodes that are curved at end portions thereof in the capacitance forming portion, the end portions are curved toward the center of the capacitance forming portion in the first direction.

17. A multilayer electronic component comprising:
a body including a capacitance forming portion including a plurality of internal electrodes overlapping each other in a first direction, the plurality of internal electrodes being alternately disposed with dielectric layers in the first direction, wherein the body has first and second surfaces opposing each other in the first direction, third and fourth surfaces connected to the first and second surfaces and opposing each other in a second direction, and fifth and sixth surfaces connected to the first to fourth surfaces and opposing each other in a third direction, and
external electrodes disposed on the body, the external electrodes include first and second external electrodes disposed on the third and fourth surfaces, respectively, wherein:
the plurality of internal electrodes includes first internal electrodes connected to the first external electrode at the third surface, and second internal electrodes connected to the second external electrode at the fourth surface, and
$[(G1+G2)/D1] \times 100$ is 2.4 or less, where G1 is a distance from an extension line of an uppermost internal electrode to an end of an internal electrode closest to the uppermost internal electrode in the first direction, G2 is a distance from an extension line of a lowermost internal electrode to an end of an internal electrode closest to the lowermost internal electrode in the first direction, and D1 is a size of the capacitance forming portion in the first direction at the center thereof in a second direction orthogonal to the first direction.

18. The multilayer electronic component of claim 17, wherein $[(G1+G2)/D1] \times 100$ is 2.35 or less.

19. The multilayer electronic component of claim 17, wherein $[(G1+G2)/D1] \times 100$ is 1.23 or less.

20. The multilayer electronic component of claim 17, wherein an average thickness of each of the internal electrodes is 0.35 μm or less.

21. The multilayer electronic component of claim 17, wherein $(D2/D1) \times 100$ is 96.5 or more, and D2 is a size of the capacitance forming portion in the first direction at an end thereof in the second direction.

22. The multilayer electronic component of claim 17, wherein
the first internal electrodes are spaced apart from the fourth surface, and the second internal electrodes are spaced apart from the third surface, and
$(D3/D1) \times 100$ is 90 or more, where D3 is a size from an uppermost first internal electrode to a lowermost first internal electrode in the first direction on the third surface of the body.

23. The multilayer electronic component of claim 17, wherein the plurality of internal electrodes include internal electrodes that are curved at end portions thereof in the capacitance forming portion and internal electrodes that are flat in the capacitance forming portion, and
in a cross-section of the body in the first and second directions, $(F1+F2)/D1 \times 100$ is 35 or less, where F1 is a maximum distance from an uppermost internal electrode to an uppermost flat internal electrode in the first direction, F2 is a maximum distance from a lowermost internal electrode to a lowermost flat internal electrode in the first direction.

* * * * *